W. C. HIGGINS.
Baskets.
No. 137,368. Patented April 1, 1873.
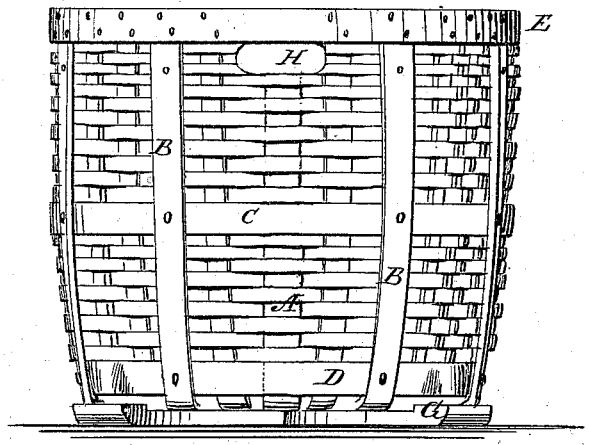
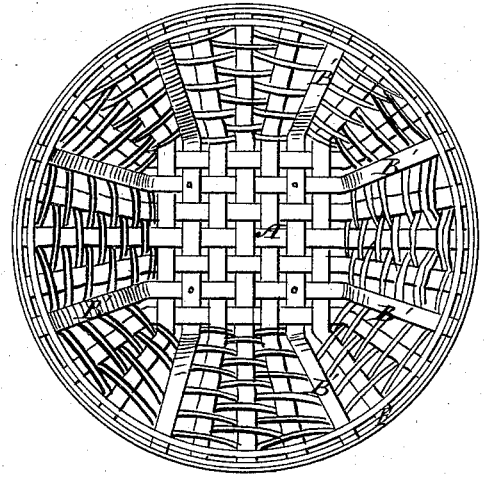
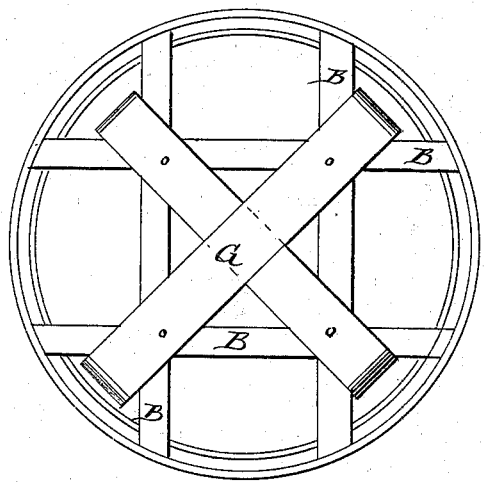

UNITED STATES PATENT OFFICE.

WILLIAM C. HIGGINS, OF NORTH BLANDFORD, MASSACHUSETTS.

IMPROVEMENT IN BASKETS.

Specification forming part of Letters Patent No. 137,368, dated April 1, 1873; application filed February 15, 1873.

*To all whom it may concern:*

Be it known that I, WILLIAM C. HIGGINS, of North Blandford, in the county of Hampden and State of Massachusetts, have invented a new and useful Improvement in Baskets, of which the following is a specification:

The object of this invention is to furnish a strong and durable basket—one which, while being elastic and yielding, will retain its shape and still be light and handy to use.

The invention consists in the improvement of baskets, as hereinafter fully described and pointed out in the claims.

In the accompanying drawing, Figure 1 is a side view. Fig. 2 is an outside view of the bottom. Fig. 3 is a top view.

Similar letters of reference indicate corresponding parts.

A represents the body of the ordinary basket, of any desired size and form. B represents the outer stays. These stays extend across the bottom and to the top of the basket. B' represents the inner stays. The inner and outer stays are arranged opposite each other, and are, consequently, equal in number, and riveted firmly together through the basket. C is a central band around the basket, and D is a band near the bottom. These bands are within the outer stays, and are confined by a nut at each intersection. E is the basket-rim, composed of an inner and an outer band, with an intermediate sectional band, F, between them—the rim thus consisting of three horizontal thicknesses, and is securely nailed or riveted to the vertical stays of the basket. This sectional band F fills the space between the outer vertical stays, and gives a smooth finish to the top of the rim. G is a foundation-cross fitted over and riveted through the stays. H represents a hand-hole on opposite sides of the basket.

A basket made in this manner is protected from damage, is light and strong, and far preferable to baskets of ordinary construction.

Having thus described my invention, I claim as new and desire to secure by Letters Patent—

1. A basket having outer stays B and inner stays B', arranged substantially as shown and described.

2. In combination with a basket having stays B B', the bottom cross G, substantially as shown and described.

WM. C. HIGGINS.

Witnesses:
HERBERT C. HIGGINS,
CHAS. E. CROSS.